United States Patent
Tsai

(10) Patent No.: US 12,082,184 B2
(45) Date of Patent: Sep. 3, 2024

(54) TCI STATE ACTIVATION FOR DOWNLINK TRANSMISSION AND UPLINK TRANSMISSION

(71) Applicant: MEDIATEK INC., Hsin-Chu (TW)

(72) Inventor: Cheng-Rung Tsai, Hsin-Chu (TW)

(73) Assignee: MediaTek Inc., Hsinchu (TW)

(*) Notice: Subject to any disclaimer, the term of this patent is extended or adjusted under 35 U.S.C. 154(b) by 324 days.

(21) Appl. No.: 17/480,942

(22) Filed: Sep. 21, 2021

(65) Prior Publication Data

US 2022/0124752 A1 Apr. 21, 2022

Related U.S. Application Data

(60) Provisional application No. 63/145,550, filed on Feb. 4, 2021, provisional application No. 63/135,767, filed
(Continued)

(51) Int. Cl.
*H04W 72/1263* (2023.01)
*H04W 52/14* (2009.01)
*H04W 72/23* (2023.01)

(52) U.S. Cl.
CPC ..... *H04W 72/1263* (2013.01); *H04W 52/143* (2013.01); *H04W 72/23* (2023.01)

(58) Field of Classification Search
CPC . H04W 72/1263; H04W 72/23; H04W 72/21; H04W 52/143; H04W 52/54; H04W 36/0055; H04L 5/0053
See application file for complete search history.

(56) References Cited

U.S. PATENT DOCUMENTS 11,564,229 B2 * 1/2023 Jin .................... H04L 5/001
11,832,285 B2 * 11/2023 Park ................... H04W 80/02
(Continued)

FOREIGN PATENT DOCUMENTS

EP          4325923 A1 *  2/2024  ............ H04W 16/28
WO    WO2019246052 A1    6/2019
WO    WO2020164600 A1   11/2019

OTHER PUBLICATIONS

Taiwan IP Office Action for related application 110138791, mailed on Jan. 4, 2022 (4 Pages).
(Continued)

*Primary Examiner* — Chi H Pham
*Assistant Examiner* — Vladislav Y Agureyev
(74) *Attorney, Agent, or Firm* — Helen Mao; Zheng Jin; Imperium Patent Works

(57) ABSTRACT

Apparatus and methods are provided for configuring TCI state activation and indication for DL transmission and UL transmission. In one novel aspect, list(s) associated with DL transmission, UL transmission or both DL transmission and UL transmission is/are provided. In particular, a UE can be configured with a plurality of TCI states. After being configured with the TCI states, the UE can receive a command that includes the list(s) associated with DL transmission, UL transmission or both DL transmission and UL transmission. The list(s) records a plurality of TCI state identifications. Accordingly, when the UE receives a value of a TCI field from a DCI and the value maps to designated TCI state identification(s) recorded on the list(s), the UE can apply designated TCI state(s) corresponding to the designated TCI state identification(s) for DL transmission, UL transmission or both DL transmission and UL transmission.

20 Claims, 10 Drawing Sheets

Related U.S. Application Data on Jan. 11, 2021, provisional application No. 63/112,205, filed on Nov. 11, 2020, provisional application No. 63/094,371, filed on Oct. 21, 2020.

(56) References Cited

U.S. PATENT DOCUMENTS

| | | | |
|---|---|---|---|
| 11,864,036 B2* | 1/2024 | Cirik | H04W 16/00 |
| 11,991,621 B2* | 5/2024 | Park | H04W 48/16 |
| 2019/0103908 A1* | 4/2019 | Yu | H04B 7/0617 |
| 2019/0253904 A1* | 8/2019 | Tsai | H04W 16/14 |
| 2019/0297603 A1* | 9/2019 | Guo | H04L 5/0053 |
| 2020/0100154 A1* | 3/2020 | Cirik | H04W 36/305 |
| 2022/0225370 A1* | 7/2022 | Park | H04L 5/0044 |
| 2022/0272674 A1* | 8/2022 | Go | H04W 72/23 |
| 2022/0278795 A1* | 9/2022 | Go | H04B 7/0408 |
| 2022/0321292 A1* | 10/2022 | Matsumura | H04W 72/23 |
| 2022/0322410 A1* | 10/2022 | Matsumura | H04W 72/1273 |
| 2023/0144103 A1* | 5/2023 | Gao | H04W 72/20 370/329 |
| 2023/0189262 A1* | 6/2023 | Zeineddine | H04L 5/0048 370/329 |
| 2023/0216626 A1* | 7/2023 | Muruganathan | H04L 1/08 370/328 |
| 2023/0217460 A1* | 7/2023 | Zhang | H04W 72/232 370/329 |
| 2023/0232481 A1* | 7/2023 | Park | H04L 5/0055 370/329 |
| 2023/0299916 A1* | 9/2023 | Muruganathan | H04L 5/0094 370/329 |
| 2023/0309178 A1* | 9/2023 | Matsumura | H04L 5/0087 |
| 2023/0319786 A1* | 10/2023 | Zheng | H04L 5/0053 370/329 |
| 2023/0370238 A1* | 11/2023 | Liu | H04B 7/0639 |
| 2023/0371054 A1* | 11/2023 | Xu | H04L 1/0025 |
| 2023/0379108 A1* | 11/2023 | Grossmann | H04L 5/0053 |
| 2023/0379843 A1* | 11/2023 | Go | H04W 52/365 |
| 2023/0379902 A1* | 11/2023 | Matsumura | H04W 16/28 |
| 2023/0379936 A1* | 11/2023 | Matsumura | H04B 7/0695 |
| 2024/0015740 A1* | 1/2024 | Xiao | H04W 72/1273 |
| 2024/0171354 A1* | 5/2024 | Manolakos | H04L 5/16 |

OTHER PUBLICATIONS

China Intellectual Property Office Action 202111213603.6, dated Jan. 30, 2024 (8 pages).

* cited by examiner

TCI STATE ACTIVATION FOR DOWNLINK TRANSMISSION AND UPLINK TRANSMISSION

CROSS REFERENCE TO RELATED APPLICATIONS

This application claims priority under 35 U.S.C. § 119 from U.S. Provisional Application No. 63/094,371, entitled "Joint and Separate TCI Activation and Indication for DL and UL," filed on Oct. 21, 2020; U.S. Provisional Application No. 63/112,205, entitled "Joint and Separate TCI Activation and Indication for DL and UL," filed on Nov. 11, 2020; U.S. Provisional Application No. 63/135,767, entitled "Joint and Separate TCI Activation and Indication for DL and UL," filed on Jan. 11, 2021; U.S. Provisional Application No. 63/145,550, entitled "Joint and Separate TCI Activation and Indication for DL and UL," filed on Feb. 4, 2021, the subject matter of which is incorporated herein by reference.

TECHNICAL FIELD

The disclosed embodiments relate generally to wireless communication, and, more particularly, to TCI state activation for downlink transmission and uplink transmission.

BACKGROUND

In conventional network of 3rd generation partnership project (3GPP) 5G new radio (NR), the user equipment (UE) can be configured, by the base station (BS), with at least one transmission configuration indication (TCI) state for downlink (DL) transmission. One TCI state is configured with quasi co-location information (QCL-Info), and each QCL-Info includes a reference signal (RS) and an associated QCL type. After being configured with the TCI state(s), the UE can receive, from the BS, an activation command having mapping relation of configured TCI state(s) and codepoint(s). Accordingly, when the UE receives, from the BS, downlink control information (DCI) carrying a codepoint in a field, the UE can determine a corresponding TCI state based on the mapping relation of configured TCI state(s) and codepoint(s). Then, the UE can utilize the corresponding TCI state for determining physical downlink shared channel (PDSCH) antenna port QCL assumption. In other words, the UE can determine the PDSCH antenna port QCL assumption according to the RS(s) and the associated QCL type(s) of the QCL-Info(s) configured in the corresponding TCI state.

In some situations, DL transmission and uplink (UL) transmission on the UE may share the same beam. In some situations, DL transmission and UL transmission on the UE may not share the same beam. However, how to indicate the UE to share the same beam for DL transmission and UL transmission or not has not been discussed yet.

SUMMARY

Apparatus and methods are provided for configuring transmission configuration indication (TCI) state activation and indication for downlink (DL) transmission and uplink (UL) transmission. In one novel aspect, at least one list associated with DL transmission, UL transmission or both DL transmission and UL transmission is provided. In particular, a user equipment (UE) can be configured, by a base station (BS), with a plurality of TCI states. After being configured with the TCI states, the UE can receive, from the BS, a command that includes the at least one list associated with DL transmission, UL transmission or both DL transmission and UL transmission. The at least one list records a plurality of TCI state identifications. Accordingly, when the UE receives, from the BS, a value of a TCI field from downlink control information (DCI) and the value maps to at least one designated TCI state identification recorded on the at least one list, the UE can apply at least one designated TCI state corresponding to the at least one designated TCI state identification for DL transmission, UL transmission or both DL transmission and UL transmission according to the at least one list.

In one embodiment, a UE receives a first command from a network. The first command includes: a first list associated with both DL transmission and UL transmission; or a second list associated with DL transmission and a third list associated with UL transmission according to a configuration. The first list records at least one first TCI state identification corresponding to at least one first TCI state and the at least one first TCI state is utilized for both DL transmission and UL transmission. The second list records at least one second TCI state identification corresponding to at least one second TCI state and the at least one second TCI state is utilized for DL transmission. The third list records at least one third TCI state identification corresponding to at least one third TCI state and the at least one third TCI state is utilized for UL transmission. The UE applies at least one designated TCI state corresponding to at least one designated TCI state identification recorded on one of the lists for DL transmission, UL transmission or both DL transmission and UL transmission.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
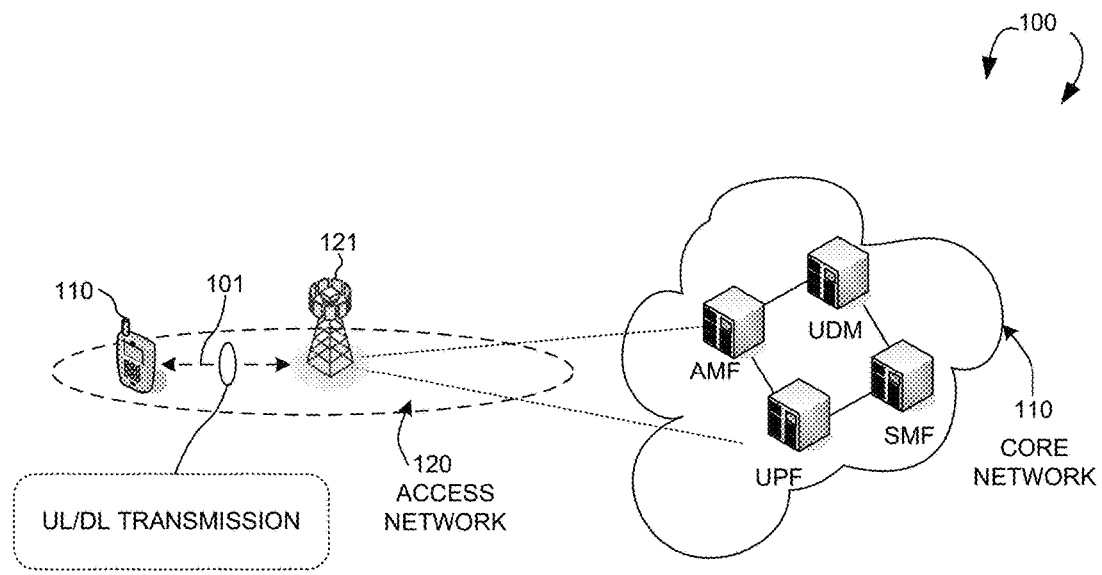
FIG. 1 illustrates an exemplary 5G new radio network supporting TCI state activation for downlink transmission and uplink transmission in accordance with embodiments of the current invention.

FIG. 1 illustrates an exemplary 5G new radio (NR) network 100 supporting transmission configuration indication (TCI) state activation for downlink (DL) transmission and uplink (UL) transmission in accordance with aspects of the current invention. The 5G NR network 100 includes a user equipment (UE) 110 communicatively connected to a gNB 121 operating in a licensed band (e.g., 30 GHz-300 GHz for mmWave) of an access network 120 which provides radio access using a Radio Access Technology (RAT) (e.g., the 5G NR technology). The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The gNB 121 may provide communication coverage for a geographic coverage area in which communications with the UE 110 is supported via a communication link 101. The communication link 101 shown in the 5G NR network 100 may include UL transmissions from the UE 110 to the gNB 121 (e.g., on the Physical Uplink Control Channel (PUCCH) or Physical Uplink Shared Channel (PUSCH)) or downlink (DL) transmissions from the gNB 121 to the UE 110 (e.g., on the Physical Downlink Control Channel (PDCCH) or Physical Downlink Shared Channel (PDSCH)).

Figure 2:
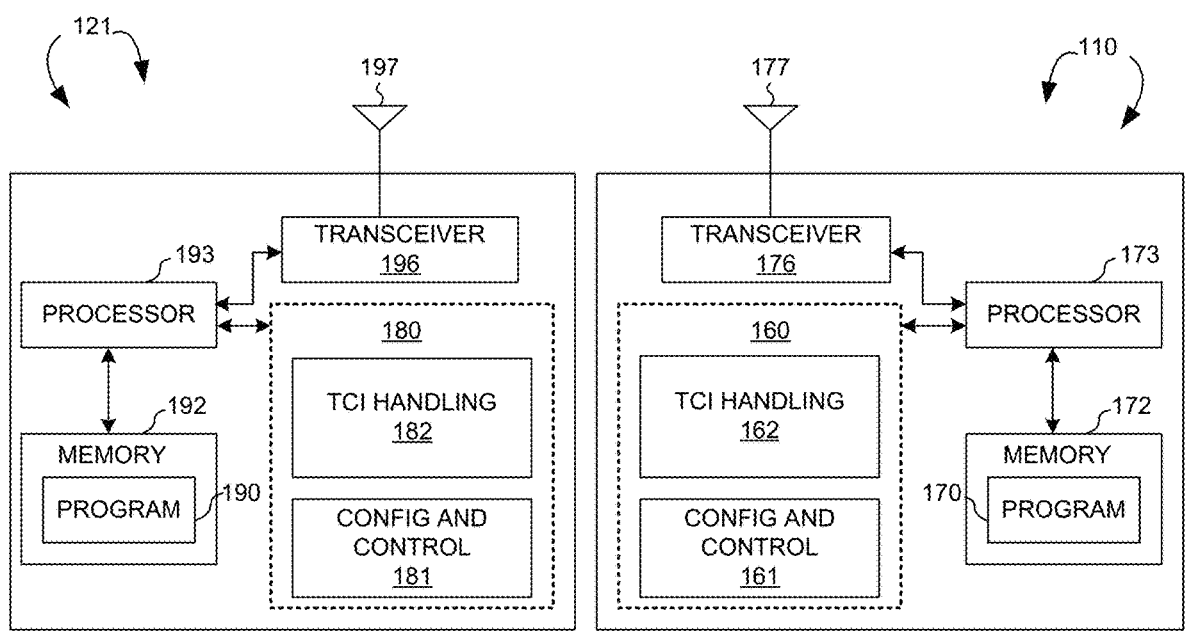
FIG. 2 is a simplified block diagram of the gNB and the UE in accordance with embodiments of the current invention.

FIG. 2 is a simplified block diagram of the gNB 121 and the UE 110 in accordance with embodiments of the present invention. For the gNB 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the gNB 121. Memory 192 stores program instructions and data 190 to control the operations of the gNB 121.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110.

The gNB 121 and the UE 110 also include several functional modules and circuits that can be implemented and configured to perform embodiments of the present invention. In the example of FIG. 2, the gNB 121 includes a set of control functional modules and circuit 180. TCI handling circuit 182 handles TCI state(s) and associated network parameters for the UE 110. Configuration and control circuit 181 provides different parameters to configure and control the UE 110. The UE 110 includes a set of control functional modules and circuit 160. TCI handling circuit 162 handles TCI state(s) and associated network parameters. Configuration and control circuit 161 handles configuration and control parameters from the gNB 121.

Note that the different functional modules and circuits can be implemented and configured by software, firmware, hardware, and any combination thereof. The function modules and circuits, when executed by the processors 193 and 173 (e.g., via executing program codes 190 and 170), allow the gNB 121 and the UE 110 to perform embodiments of the present invention.

Figure 3A:
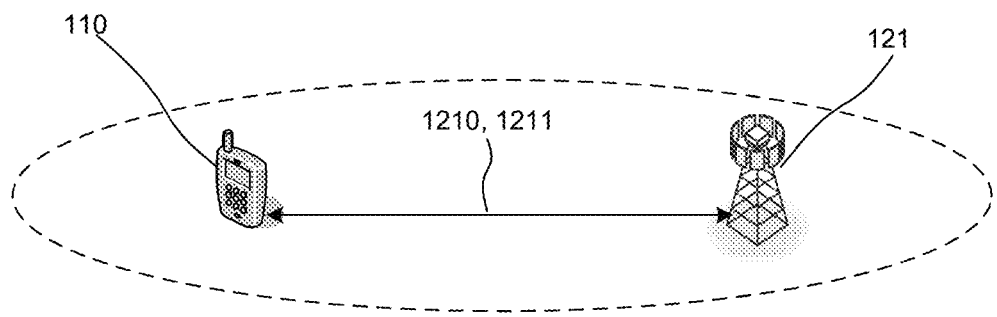
FIG. 3A illustrates one embodiment of message transmissions in accordance with embodiments of the current invention.

FIG. 3A illustrates one embodiment of message transmissions in accordance with one novel aspect. In particular, the gNB 121 transmits a higher layer configuration 1210 to the UE 110. The UE 110 receives the higher layer configuration 1210 from the gNB 121.

Figure 3B:
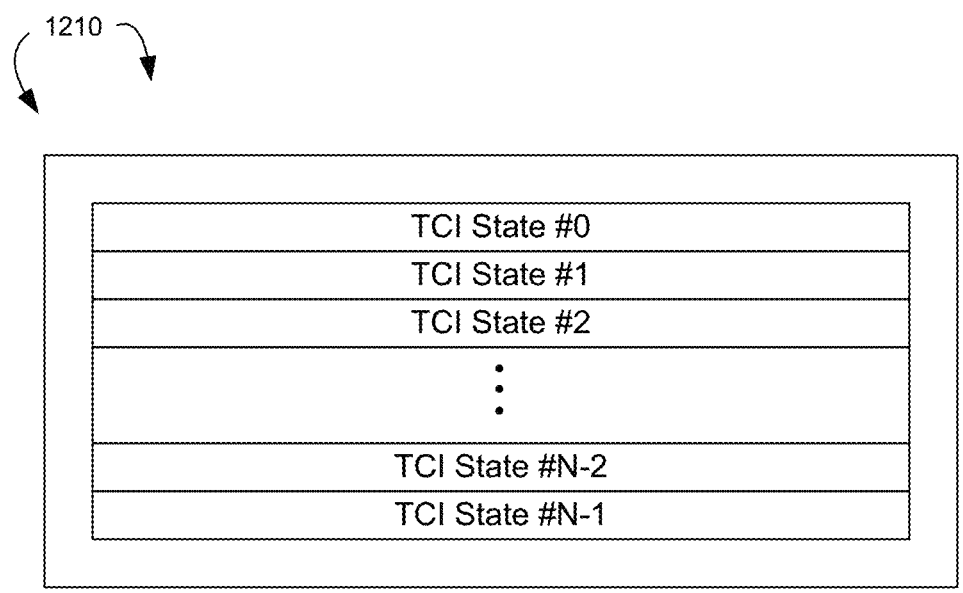
FIG. 3B illustrates one embodiment of the higher layer configuration in accordance with embodiments of the current invention.

FIG. 3B illustrates one embodiment of the higher layer configuration 1210 in accordance with one novel aspect. In detail, the higher layer configuration 1210 indicates to the UE 110 a plurality of TCI states '#0' to '#N−1' and a plurality of RS resources. Each of the TCI states '#0' to '#N−1' associates with at least one of the RS resources. It should be noted that the higher layer configuration 1210 may be a radio resource control (RRC) signal.

Then, the gNB 121 transmits a command 1211 to the UE 110. According to a configuration, the command 1211 includes: one list associated with both DL transmission and UL transmission; or two lists associated with DL transmission and UL transmission, respectively. The configuration can be determined from the command 1211 or another received command. Each of the lists records at least one TCI state identification corresponding to at least one TCI state.

Figure 3C:
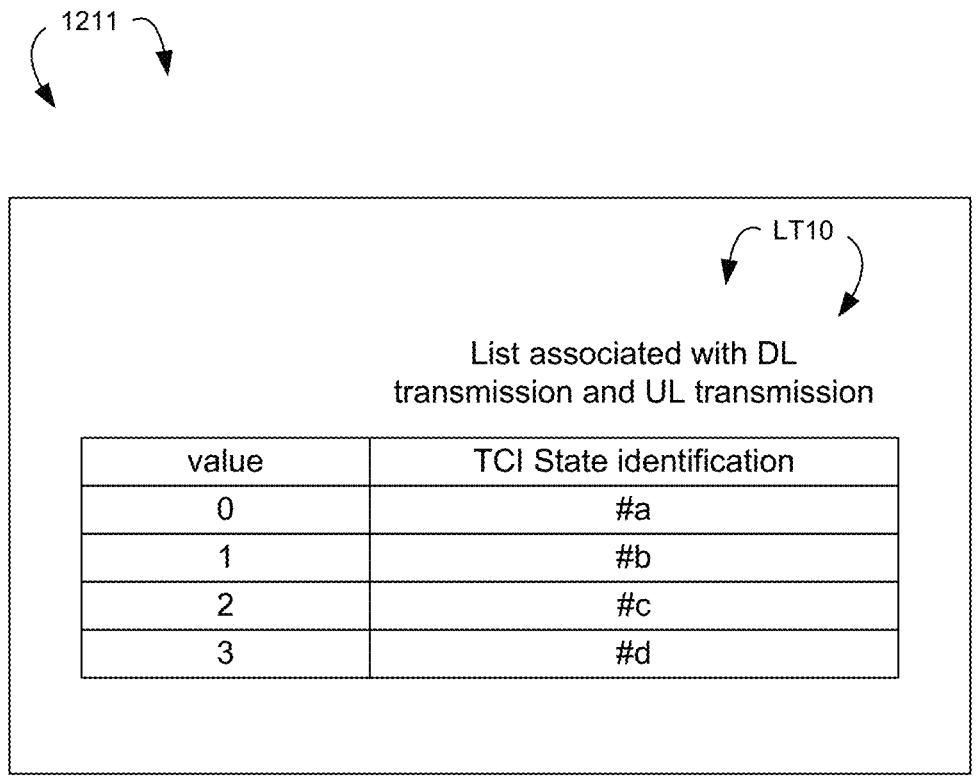
FIG. 3C illustrates one embodiment of at least one list in accordance with embodiments of the current invention.

Please refer to FIG. 3C which illustrates one embodiment of one list in accordance with one novel aspect. In particular, the list includes a first list LT10 associated with both DL transmission and UL transmission. In other words, TCI state(s), which correspond to TCI state identification(s)

recorded on the first list LT10, are utilized for both DL transmission and UL transmission.

In this embodiment, the first list LT10 records a plurality of TCI state identifications '#a', '#b', '#c', '#d' mapping to values (e.g., codepoints) '0', '1', '2', '3'. The TCI state identifications '#a', '#b', '#c', '#d' correspond to a plurality of TCI states '#a', '#b', '#c', '#d' of the TCI states '#0' to '#N−1. Accordingly, each of the TCI states '#a', '#b', '#c', '#d' is utilized for both DL transmission and UL transmission.

Figure 3D:
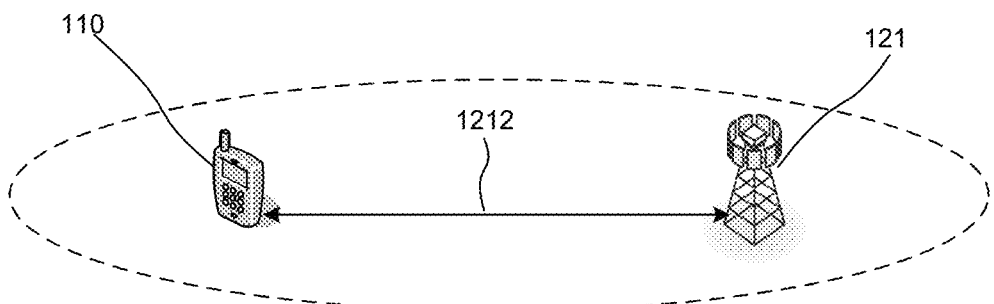
FIG. 3D illustrates one embodiment of message transmissions in accordance with embodiments of the current invention.

FIG. 3D illustrates one embodiment of message transmissions in accordance with one novel aspect. In particular, the gNB 121 transmits a DCI 1212 to the UE 110. The UE 110 receives a value of a TCI field from the DCI 1212. The value maps to at least one designated TCI state identification recorded on the first list LT10. Accordingly, the UE 110 applies at least one designated TCI state corresponding to the at least one designated TCI state identification for both DL transmission and UL transmission.

For example, the DCI 1212 includes a TCI field which has a value '1'. Therefore, after receiving the value of the TCI field from the DCI 1212, the UE 110 is indicated with the value '1' and determines the TCI state identification '#b', which is mapped to the value '1', recorded on the first list LT10. Accordingly, the UE 110 applies the TCI state '#b' corresponding to the TCI state identification '#b' for both of DL transmission and UL transmission since the TCI state identification '#b' is recorded on the first list LT10 which is associated with both DL transmission and UL transmission.

Figure 4A:
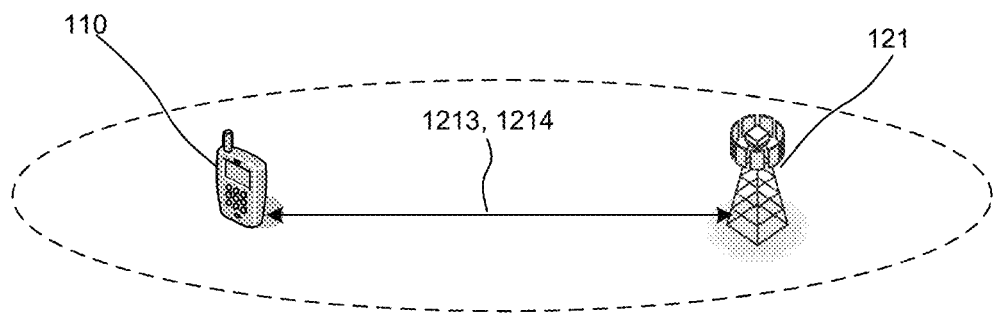
FIG. 4A illustrates one embodiment of message transmissions in accordance with embodiments of the current invention.

FIG. 4A illustrates one embodiment of message transmissions in accordance with one novel aspect. In particular, the gNB 121 transmits a higher layer configuration 1213 to the UE 110. The UE 110 receives the higher layer configuration 1213 from the gNB 121.

Figure 4B:
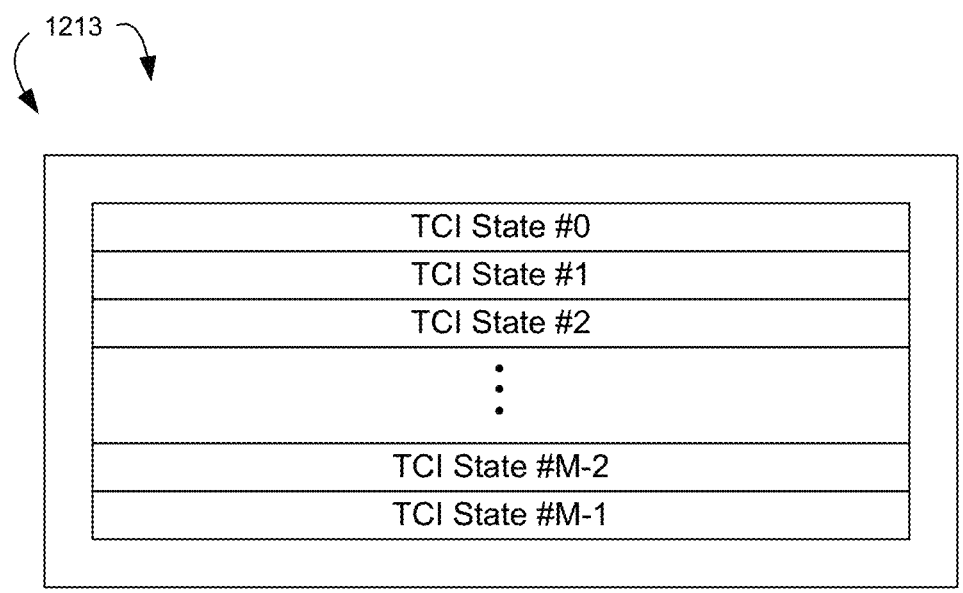
FIG. 4B illustrates one embodiment of the higher layer configuration in accordance with embodiments of the current invention.

FIG. 4B illustrates one embodiment of the higher layer configuration 1213 in accordance with one novel aspect. In detail, the higher layer configuration 1213 indicates to the UE 110 a plurality of TCI states '#0' to '#M−1' and a plurality of RS resources. Each of the TCI states '#0' to '#M−1' associates with at least one of the RS resources. It should be noted that the higher layer configuration 1213 may be an RRC signal.

Then, the gNB 121 transmits a command 1214 to the UE 110. According to a configuration, the command 1214 includes: one list associated with both DL transmission and UL transmission; or two lists associated with DL transmission and UL transmission, respectively. The configuration can be determined from the command 1214 or another received command. Each of the lists records at least one TCI state identification corresponding to at least one TCI state.

Figure 4C:
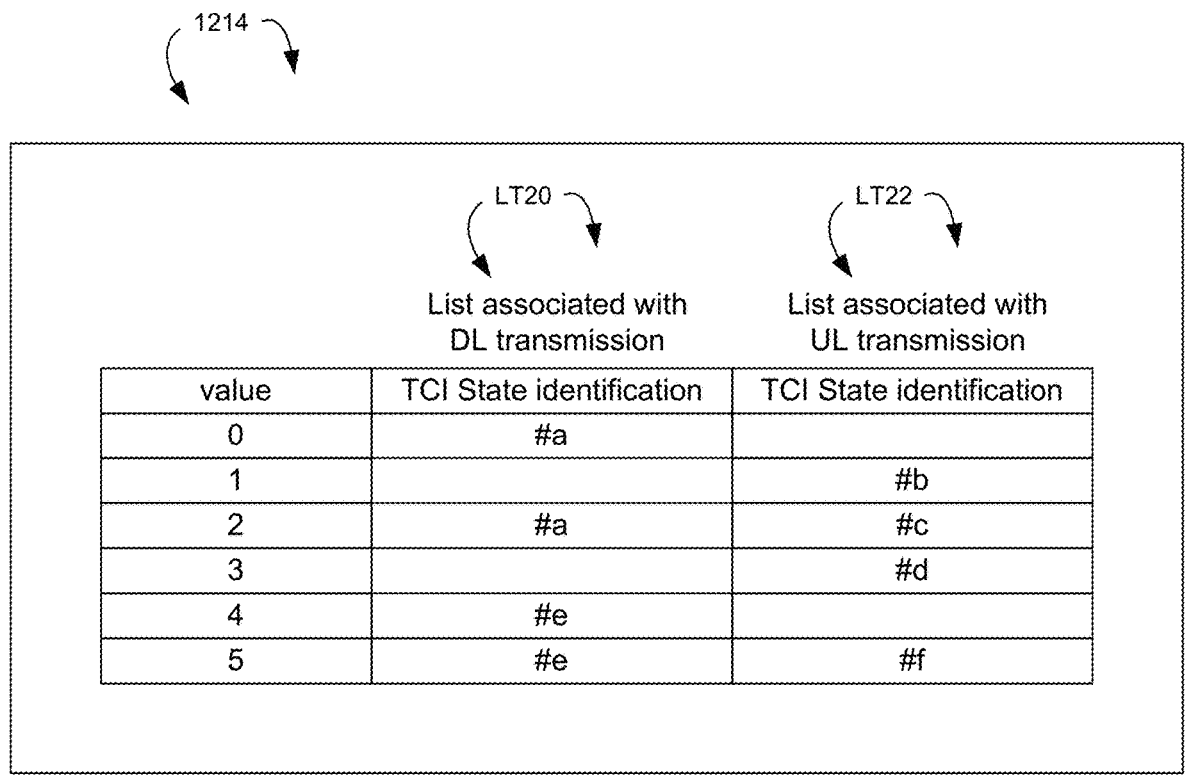
FIG. 4C illustrates one embodiment of lists in accordance with embodiments of the current invention.

Please refer to FIG. 4C which illustrates one embodiment of two lists in accordance with one novel aspect. In particular, the two lists include a first list LT20 and a second list LT22. The first list LT20 is associated with DL transmission. In other words, TCI state(s), which correspond to TCI state identification(s) recorded on the first list LT20, are utilized for DL transmission. The second list LT22 is associated with UL transmission. In other words, TCI state(s), which correspond to TCI state identification(s) recorded on the second list LT22, are utilized for UL transmission.

In this embodiment, the first list LT20 associated with DL transmission records a plurality of TCI state identifications '#a', '#a', '#e', '#e' mapping to the values (e.g., codepoints) '0', '2', '4', '5'. The TCI state identifications '#a', '#e' correspond to a plurality of TCI states '#a', '#e' of the TCI states '#0' to '#M−1. Accordingly, each of the TCI states '#a', '#e' is utilized for DL transmission.

In this embodiment, the second list LT22 associated with UL transmission records a plurality of TCI state identifications '#b', '#c', '#d', '#f' mapping to the values (e.g., codepoints) '1', '2', '3', '5'. The TCI state identifications '#b', '#c', '#d', '#f' correspond to a plurality of TCI states '#b', '#c', '#d', '#f' of the TCI states '#0' to '#M−1. Accordingly, each of the TCI states '#b', '#c', '#d', '#f' is utilized for UL transmission.

Figure 4D:
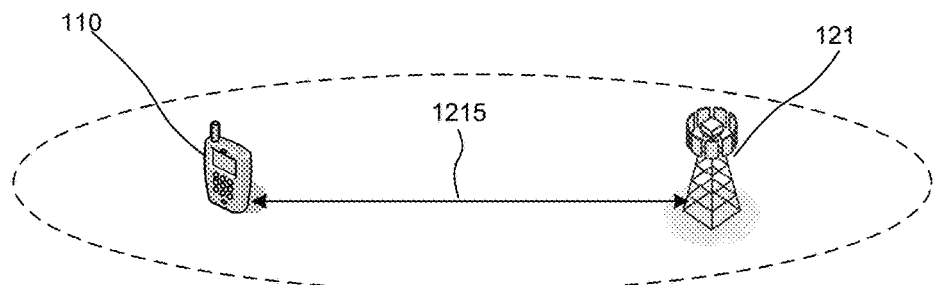
FIG. 4D illustrates one embodiment of message transmissions in accordance with embodiments of the current invention.

FIG. 4D illustrates one embodiment of message transmissions in accordance with one novel aspect. In particular, the gNB 121 transmits a DCI 1215 to the UE 110. The UE 110 receives a value of a TCI field from the DCI 1215. The value maps to at least one designated TCI state identification recorded on the first list LT20 and/or the second list LT22. Accordingly, the UE 110 applies at least one designated TCI state corresponding to the at least one designated TCI state identification for DL transmission, UL transmission or both DL transmission, UL transmission.

For example, the DCI 1215 includes a TCI field which has a value '0'. Therefore, after receiving the value of the TCI field of the DCI 1215, the UE 110 is indicated with the value '0' and determines the TCI state identification '#a', which is mapped to the value '0', recorded on the first list LT20. Accordingly, the UE 110 applies the TCI state '#a' corresponding to the TCI state identification '#a' for DL transmission since the TCI state identification '#a' is recorded on the first list LT20 which is associated with DL transmission.

For another example, the DCI 1215 includes a TCI field which has a value '2'. Therefore, after receiving the value of the TCI field from the DCI 1215, the UE 110 is indicated with the value '2' and determines: (1) the TCI state identification '#a', which is mapped to the value '2', recorded on the first list LT20; and (2) the TCI state identification '#c', which is mapped to the value '2', recorded on the second list LT22. Accordingly, the UE 110 applies the TCI state '#a' corresponding to the TCI state identification '#a' for DL transmission since the TCI state identification '#a' is recorded on the first list LT20 which is associated with DL transmission. Further, the UE 110 applies the TCI state '#c' corresponding to the TCI state identification '#c' for UL transmission since the TCI state identification '#c' is recorded on the second list LT22 which is associated with UL transmission.

For another example, the DCI 1215 includes a TCI field which has a value '3'. Therefore, after receiving the value of the TCI field from the DCI 1215, the UE 110 is indicated with the value '3' and determines the TCI state identification '#d', which is mapped to the value '3', recorded on the second list LT22. Accordingly, the UE 110 applies the TCI state '#d' corresponding to the TCI state identification '#d' for UL transmission since the TCI state identification '#d' is recorded on the second list LT22 which is associated with UL transmission.

It should be noted that, in one implementation, the higher layer configuration 1213 can configure a presence of the TCI field of the DCI 1215. More specifically, the TCI field configured by the higher layer configuration 1213 is utilized to indicate a value mapping to the TCI state identification(s) recorded on the at least one list associated with DL transmission, UL transmission or both DL transmission and UL transmission.

In one implementation, the first list LT20 and the second LT22 can be included in the same command (e.g., the command 1214). In one implementation, the first list LT20 and the second LT22 can be included in different commands (e.g., the command 1214 and another command).

In one implementation, the at least one designated TCI state is applied to a cell or a group of cells.

Figure 5A:
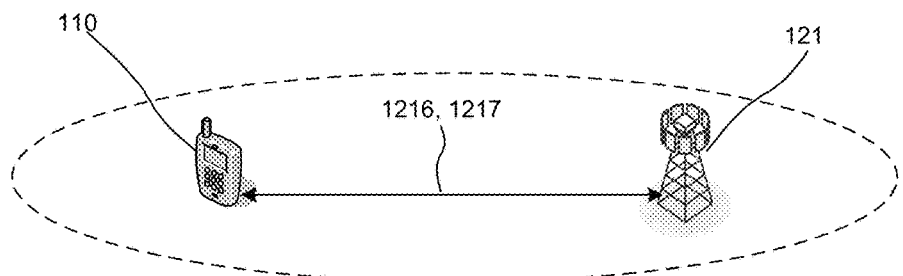
FIG. 5A illustrates one embodiment of message transmissions in accordance with embodiments of the current invention.

FIG. 5A illustrates one embodiment of message transmissions in accordance with one novel aspect. In particular, the gNB 121 transmits a higher layer configuration 1216 to the UE 110. The UE 110 receives the higher layer configuration 1216 from the gNB 121.

Figure 5B:
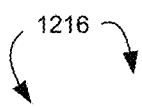
FIG. 5B illustrates one embodiment of the higher layer configuration in accordance with embodiments of the current invention.
Figure 5B:
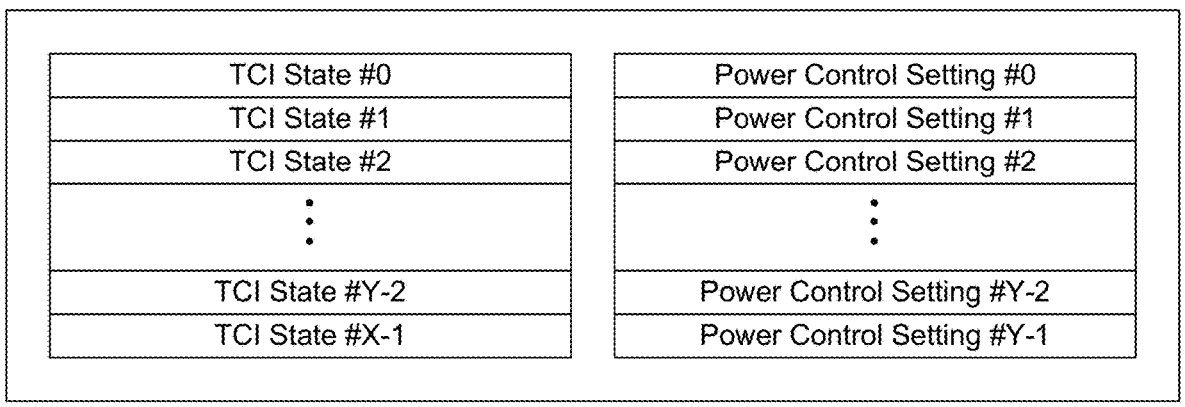

FIG. 5B illustrates one embodiment of the higher layer configuration 1216 in accordance with one novel aspect. In detail, the higher layer configuration 1216 indicates to the UE 110 a plurality of TCI states '#0' to '#X−1' and a plurality of RS resources. Each of the TCI states '#0' to '#X−1' associates with at least one of the RS resources. In addition, the higher layer configuration 1216 indicates to the UE 110 a plurality of power control setting '#0' to '#Y−1'. It should be noted that the higher layer configuration 1216 may be an RRC signal.

Then, the gNB 121 transmits a command 1217 to the UE 110. According to a configuration, the command 1217 includes: one list associated with both DL transmission and UL transmission; or two lists associated with DL transmission and UL transmission, respectively. The configuration can be determined from the command 1217 or another received command. Each of the lists records at least one TCI state identification corresponding to at least one TCI state.

Figure 5C:
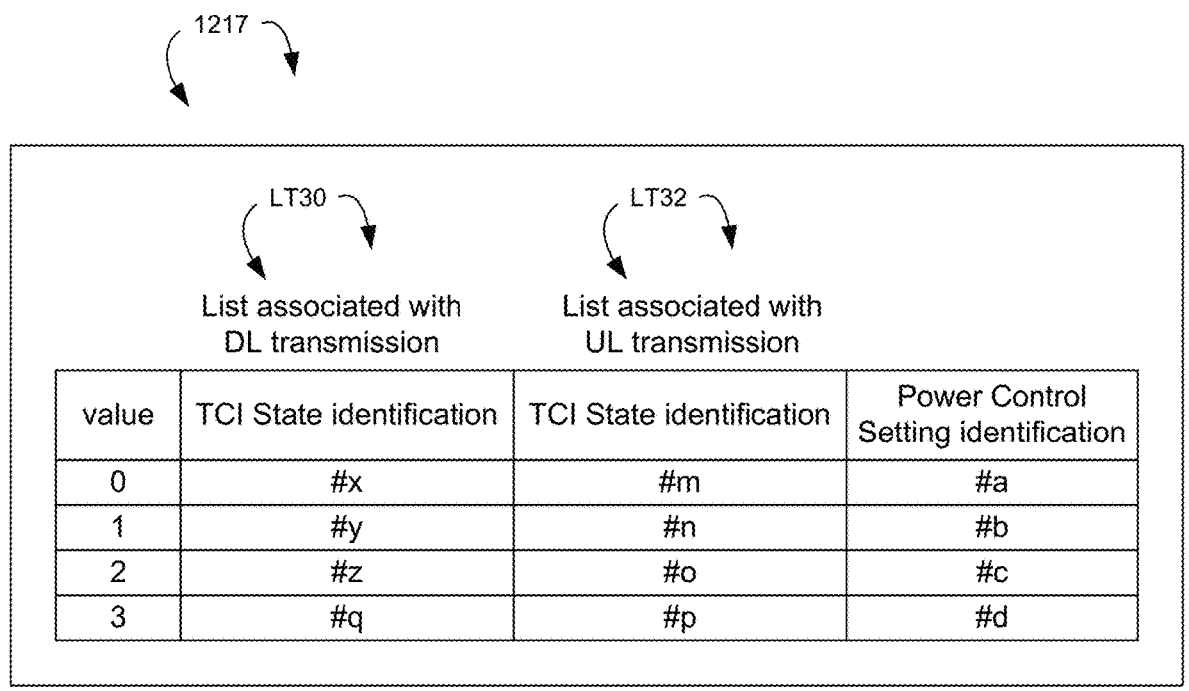
FIG. 5C illustrates one embodiment of two lists in accordance with embodiments of the current invention.

Please refer to FIG. 5C which illustrates one embodiment of two lists in accordance with one novel aspect. In particular, the two lists includes a first list LT30 and a second list LT32. The first list LT23 is associated with DL transmission. In other words, TCI state(s), which correspond to TCI state identification(s) recorded on the first list LT30, are utilized for DL transmission. The second list LT32 is associated with UL transmission. In other words, TCI state(s), which correspond to TCI state identification(s) recorded on the second list LT32, are utilized for UL transmission.

In this embodiment, the first list LT30 records a first part of plurality of TCI state identifications '#x', '#y', '#z', '#q' mapping to the values (e.g., codepoints) '0', '1', '2', '3'. The TCI state identifications '#x', '#y', '#z', '#q' correspond to a plurality of TCI states '#x', '#y', '#z', '#q' of the TCI states '#0' to '#X−1. Accordingly, each of the TCI states '#x', '#y', '#z', '#q' is utilized for DL transmission.

In this embodiment, the second list LT32 records a plurality of TCI state identifications '#m', '#n', '#o', '#p' mapping to the values '0', '1', '2', '3'. The TCI state identifications '#m', '#n', '#o', '#p' correspond to a plurality of TCI states '#m', '#n', '#o', '#p' of the TCI states '#0' to '#X−1. Accordingly, each of the TCI states '#m', '#n', '#o', '#p' is utilized for UL transmission.

In addition, the command 1217 indicates to the UE 110 mapping relations between the values '0', '1', '2', '3' and a plurality of power setting identifications '#a', '#b', '#c', '#d'.

Figure 5D:
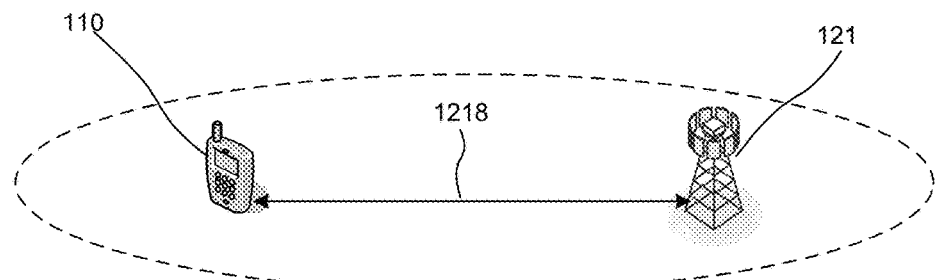
FIG. 5D illustrates one embodiment of message transmissions in accordance with embodiments of the current invention.

FIG. 5D illustrates one embodiment of message transmissions in accordance with one novel aspect. In particular, the gNB 121 transmits a DCI 1218 to the UE 110. The UE 110 receives a value of a TCI field from the DCI 1218. The value maps to: (1) at least one designated TCI state identification recorded on the first list LT30 and/or the second list LT32; and (2) at least one designated power control setting identification. Accordingly, the UE 110 applies: (1) at least one designated TCI state corresponding to the at least one designated TCI state identification and (2) at least one designated power control setting corresponding to the at least one designated power control setting identification for DL transmission, UL transmission or both DL transmission, UL transmission.

For example, the DCI 1218 includes a TCI field which has a value '2'. Therefore, after receiving the value of the TCI field from the DCI 1218, the UE 110 is indicated with the value '2' and determines: (1) the TCI state identification '#z', which is mapped to the value '2', recorded on the first list LT30; (2) the TCI state identification '#o', which is mapped to the value '2', recorded on the second list LT32; and (3) the power control setting identification '#c' which is mapped to the value '2'. Accordingly, the UE 110 applies the TCI state '#z' corresponding to the TCI state identification '#z' for DL transmission since the TCI state identification '#z' is recorded on the first list LT30 which is associated with DL transmission. Further, the UE 110 applies the TCI state '#o' corresponding to the TCI state identification '#o' for UL transmission since the TCI state identification '#o' is recorded on the second list LT32 which is associated with UL transmission. In addition, the UE 110 applies the power control setting '#c' corresponding to the power control setting identification '#c' for UL transmission.

Figure 6:
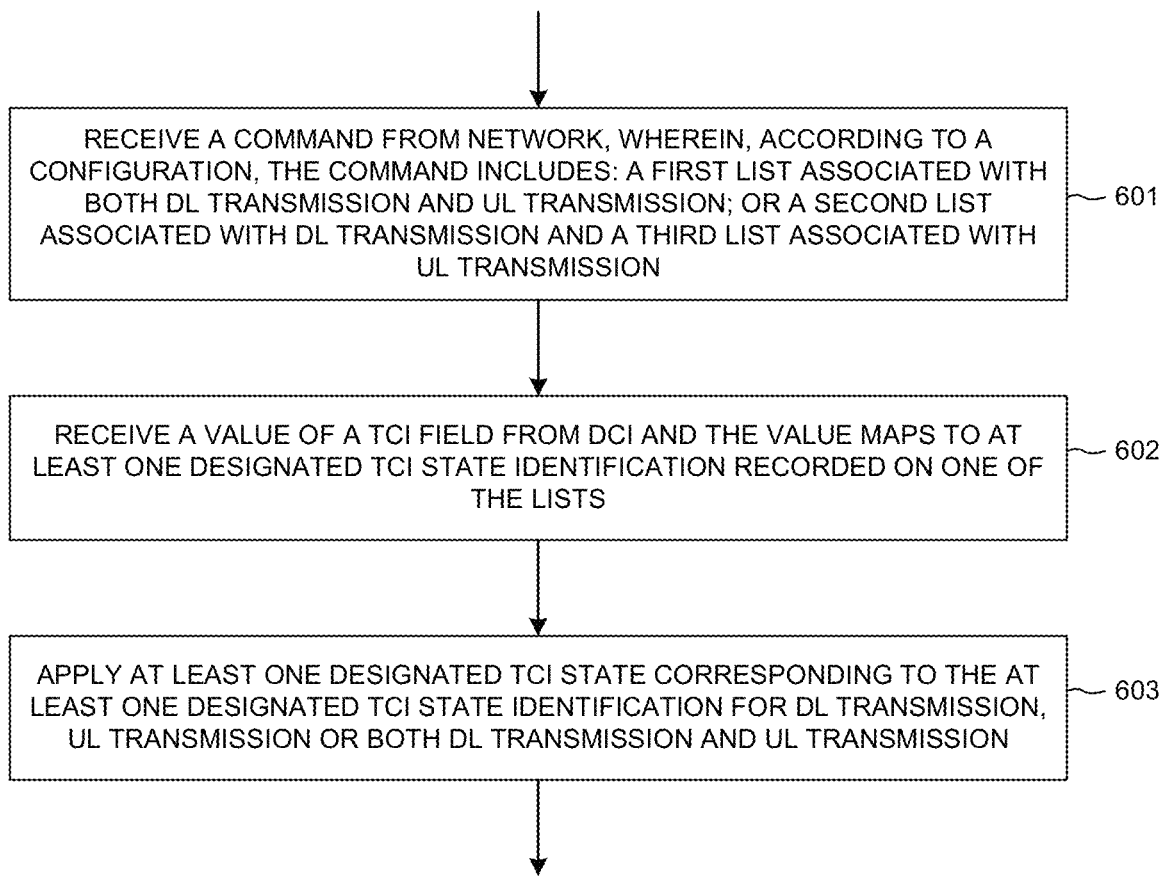
FIG. 6 is a flow chart of a method of configuring TCI state activation for DL transmission and UL transmission in accordance with embodiments of the current invention.

FIG. 6 is a flow chart of a method of configuring TCI state activation for DL transmission and UL transmission in accordance with one novel aspect. In step 601, a UE receives a command from a network. According to a configuration, the command includes: a first list associated with both DL transmission and UL transmission; or a second list associated with DL transmission and a third list associated with UL transmission. In one implementation, the configuration can be determined from the command or another received command.

The first list records at least one first TCI state identification corresponding to at least one first TCI state and the first TCI state is utilized for both DL transmission and UL transmission. The second list records at least one second TCI state identification corresponding to at least one second TCI state and the second TCI state is utilized for DL transmission. The third list records at least one third TCI state identification corresponding to at least one third TCI state and the third TCI state is utilized for UL transmission.

In step 602, the UE receives a value of TCI field from a DCI and the value maps to at least one designated TCI state identification recorded on one of the lists. In step 603, the UE applies at least one designated TCI state corresponding to the at least one designated TCI state identification for DL transmission, UL transmission or both DL transmission and UL transmission.

Figure 7:
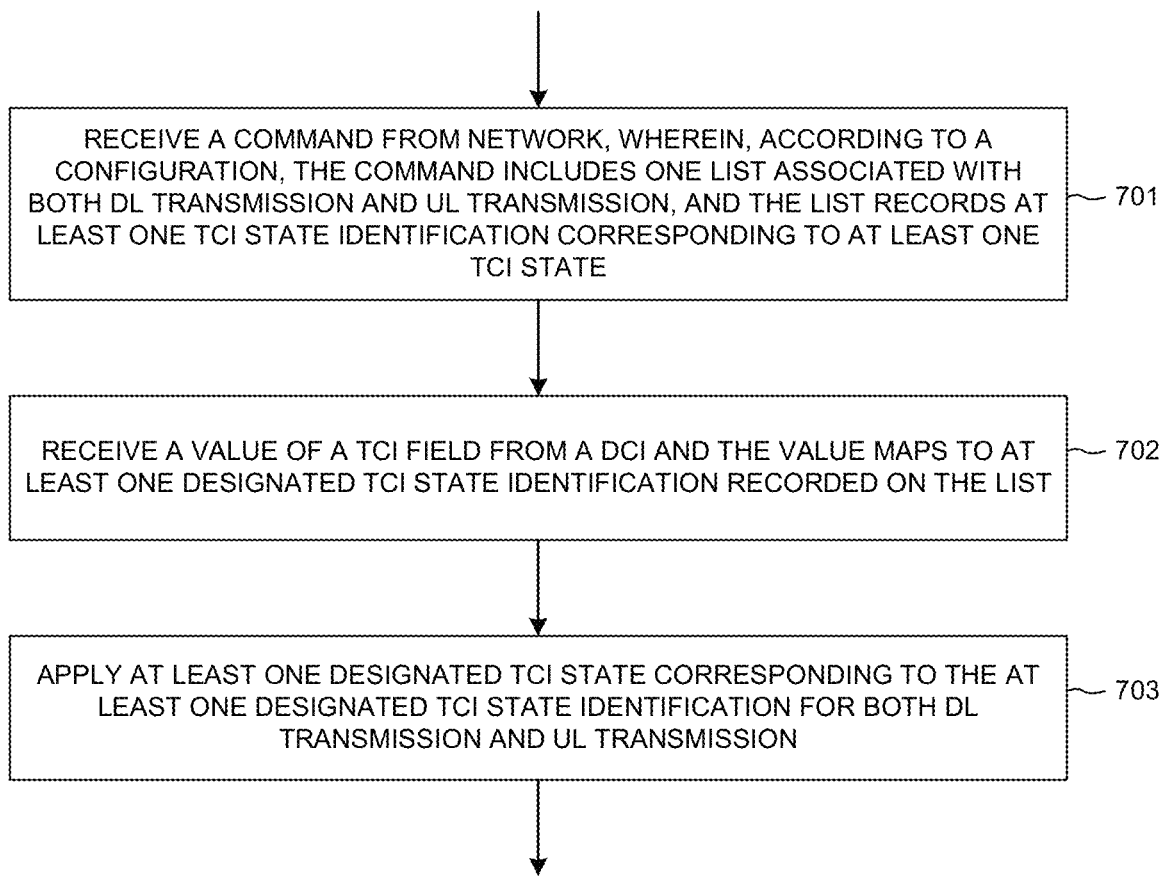
FIG. 7 is a flow chart of a method of configuring TCI state activation for DL transmission and UL transmission in accordance with embodiments of the current invention.

FIG. 7 is a flow chart of a method of configuring TCI state activation for DL transmission and UL transmission in accordance with one novel aspect. In step 701, a UE receives a command from a network. According to a configuration, the command includes one list associated with both DL transmission and UL transmission. The list records at least one TCI state identification corresponding to at least one TCI state and the TCI state is utilized for both DL transmission and UL transmission. In one implementation, the configuration can be determined from the command or another received command.

In step 702, the UE receives a value of a TCI field from a DCI and the value maps to at least one designated TCI state identification recorded on the list. In step 703, the UE applies at least one designated TCI state corresponding to the at least one designated TCI state identification for both DL transmission and UL transmission. In one implementation, the at least one designated TCI state is applied to a cell or a group of cells.

Figure 8A:
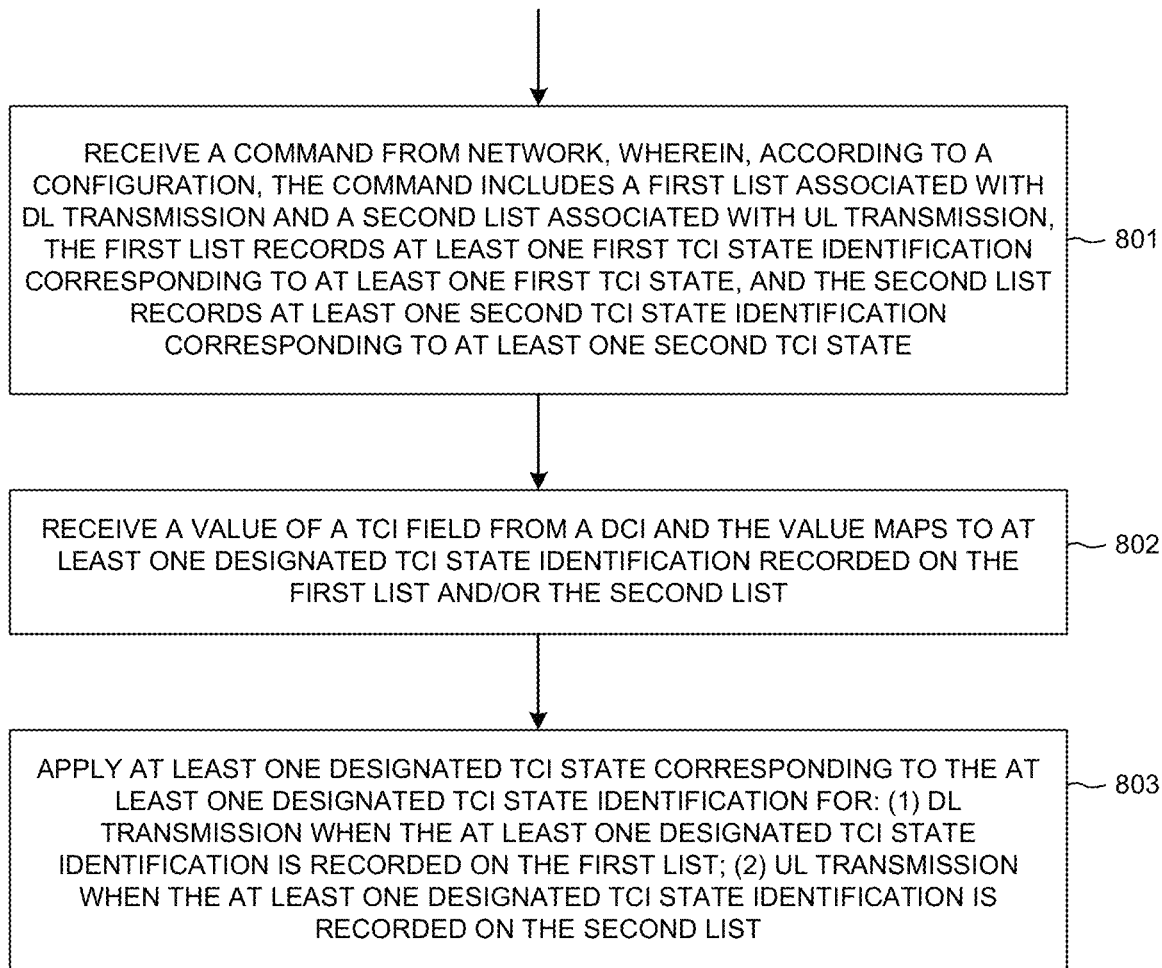
FIGS. 8A and 8B are flow charts of a method of configuring TCI state activation for DL transmission and UL transmission in accordance with embodiments of the current invention.
Figure 8B:
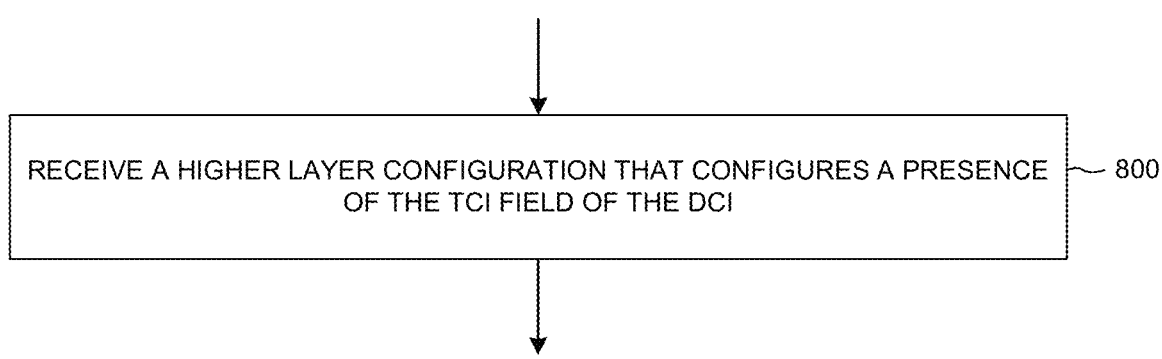

FIGS. 8A and 8B are flow charts of a method of configuring TCI state activation for DL transmission and UL transmission in accordance with one novel aspect. In step

801, a UE receives a command from a network. According to a configuration, the command includes a first list associated with DL transmission and a second list associated with UL transmission. In one implementation, the configuration can be determined from the command or another received command.

The first list records at least one first TCI state identification corresponding to at least one first TCI state and the first TCI state is utilized for DL transmission. The second list records at least one second TCI state identification corresponding to at least one second TCI state and the second TCI state is utilized for UL transmission.

In step 802, the UE receives a value of a TCI field from a DCI and the value maps to at least one designated TCI state identification recorded on the first list and/or the second list. In step 803, the UE applies at least one designated TCI state corresponding to the at least one designated TCI state identification for: (1) DL transmission when the at least one designated TCI state identification is recorded on the first list; (2) UL transmission when the at least one designated TCI state identification is recorded on the second list. In one implementation, the at least one designated TCI state is applied to a cell or a group of cells.

In one implementation, the value further maps to a power control setting identification. Therefore, in step 803, the UE further applies a power control setting corresponding to the power control setting identification for UL transmission.

In one implementation, before step 801, a higher layer configuration can be utilized to configure a presence of the TCI field of the DCI. In step 800, the UE receives the higher layer configuration that configures the presence of the TCI field of the DCI.

In one implementation, the first list and the second can be included in the same command. In one implementation, the first list and the second can be included in different commands.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    receiving, by a user equipment (UE), a first command from a network, wherein the first command includes:
        a second list associated with downlink (DL) transmission and a third list associated with uplink (UL) transmission, wherein the second list records at least one second transmission configuration indication (TCI) state identification corresponding to at least one second TCI state, the at least one second TCI state is utilized for DL transmission, the third list records at least one third TCI state identification corresponding to at least one third TCI state and the at least one third TCI state is utilized for UL transmission;
    receiving an indication indicating whether the second list and the third list apply or a first list applies, wherein the first list associated with both DL transmission and UL transmission, wherein the first list records at least one first TCI state identification corresponding to at least one first TCI state and the at least one first TCI state is utilized for both DL transmission and UL transmission; and
    applying, by the UE, at least one designated TCI state corresponding to at least one designated TCI state identification recorded on one of the lists for DL transmission, UL transmission or both DL transmission and UL transmission.

2. The method of claim 1, further comprising:
    determining, by the UE, whether the first command includes the first list or the second list and the third list according a configuration from the first command or a second command.

3. The method of claim 1, further comprising:
    receiving, by the UE, a value of a transmission configuration indication (TCI) field from a downlink control information (DCI), wherein the value maps to the at least one designated TCI state identification recorded on one of the lists.

4. The method of claim 3, wherein the first command includes the first list, the at least one designated TCI state identification mapped to the value is recorded on the first list, and the at least one designated TCI state is applied for both DL transmission and UL transmission.

5. The method of claim 3, wherein the first command includes the second list and the third list, the at least one designated TCI state identification mapped to the value is recorded on the second list, and the at least one designated TCI state is applied for DL transmission.

6. The method of claim 3, wherein the first command includes the second list and the third list, the at least one designated TCI state identification mapped to the value is recorded on the third list, and the at least one designated TCI state is applied for UL transmission.

7. The method of claim 3, wherein the first command includes the second list and the third list, the at least one designated TCI state identification includes at least one first designated TCI state identification and at least one second designated TCI state identification, the at least one first designated TCI state identification mapped to the value is recorded on the second list, the at least one second designated TCI state identification mapped to the value is recorded on the third list, at least one first designated TCI state corresponding to the at least one first designated TCI state identification is applied for DL transmission, and at least one second designated TCI state corresponding to the at least one second designated TCI state identification is applied for UL transmission.

8. The method of claim 3, wherein the at least one designated TCI state is applied on a cell or a group of cells.

9. The method of claim 3, wherein the value further maps to a power control setting identification.

10. The method of claim 3, further comprising:
    receiving, by the UE, a higher layer configuration, wherein the higher layer configuration configures a presence of the TCI field of the DCI.

11. A user equipment (UE) comprising:
    a transceiver that:
        receives a first command from a network, wherein the first command includes:
            a second list associated with downlink (DL) transmission and a third list associated with uplink (UL) transmission, wherein the second list records at least one second transmission configuration indication (TCI) state identification corresponding to at least one second TCI state, the at least one second TCI state is utilized for DL transmission, the third list records at least one third TCI state identification corresponding to at least one third TCI state and the at least one third TCI state is utilized for UL transmission; and receives an indication indicating whether the second list and the third list apply or a first list applies, wherein the first list associated with both DL transmission and UL transmission, wherein the first list records at least one first TCI state identification corresponding to at least one first TCI state and the at least one first TCI state is utilized for both DL transmission and UL transmission; and a transmission configuration indication (TCI) handling circuit that:

applies at least one designated TCI state corresponding to at least one designated TCI state identification recorded on one of the lists for DL transmission, UL transmission or both DL transmission and UL transmission.

12. The UE of claim 11, wherein the TCI handling circuit further determines whether the first command includes the first list or the second list and the third list according a configuration from the first command or a second command.

13. The UE of claim 11, wherein the transceiver receives a value of a transmission configuration indication (TCI) field from a downlink control information (DCI), the value maps to the at least one designated TCI state identification recorded on one of the lists.

14. The UE of claim 13, wherein the first command includes the first list, the at least one designated TCI state identification mapped to the value is recorded on the first list, and the at least one designated TCI state is applied for both DL transmission and UL transmission.

15. The UE of claim 13, wherein the first command includes the second list and the third list, the at least one designated TCI state identification mapped to the value is recorded on the second list, and the at least one designated TCI state is applied for DL transmission.

16. The UE of claim 13, wherein the first command includes the second list and the third list, the at least one designated TCI state identification mapped to the value is recorded on the third list, and the at least one designated TCI state is applied for UL transmission.

17. The UE of claim 13, wherein the first command includes the second list and the third list, the at least one designated TCI state identification includes at least one first designated TCI state identification and at least one second designated TCI state identification, the at least one first designated TCI state identification mapped to the value is recorded on the second list, the at least one second designated TCI state identification mapped to the value is recorded on the third list, at least one first designated TCI state corresponding to the at least one first designated TCI state identification is applied for DL transmission, and at least one second designated TCI state corresponding to the second designated TCI state identification is applied for UL transmission.

18. The UE of claim 13, wherein the at least one designated TCI state is applied on a cell or a group of cells.

19. The UE of claim 13, wherein the value further maps to a power control setting identification.

20. The UE of claim 13, wherein the transceiver further receives a higher layer configuration, and the higher layer configuration configures a presence of the TCI field of the DCI.

* * * * *